United States Patent
Gupta

(10) Patent No.: US 11,734,312 B2
(45) Date of Patent: *Aug. 22, 2023

(54) FEATURE TRANSFORMATION AND MISSING VALUES

(71) Applicant: Airbnb, Inc., San Francisco, CA (US)

(72) Inventor: Alok Gupta, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 262 days.

This patent is subject to a terminal disclaimer.

(21) Appl. No.: 16/689,015

(22) Filed: Nov. 19, 2019

(65) Prior Publication Data

US 2020/0151200 A1 May 14, 2020

Related U.S. Application Data

(63) Continuation of application No. 14/968,754, filed on Dec. 14, 2015, now Pat. No. 10,534,799.

(51) Int. Cl.
| | |
|---|---|
| *G06F 16/28* | (2019.01) |
| *G06F 16/25* | (2019.01) |
| *G06N 5/045* | (2023.01) |
| *G06N 20/00* | (2019.01) |
| *G06N 7/01* | (2023.01) |

(52) U.S. Cl.
CPC .......... *G06F 16/285* (2019.01); *G06F 16/258* (2019.01); *G06N 5/045* (2013.01); *G06N 7/01* (2023.01); *G06N 20/00* (2019.01)

(58) Field of Classification Search
None
See application file for complete search history.

(56) References Cited

U.S. PATENT DOCUMENTS

| | | |
|---|---|---|
| 10,360,220 B1 | 7/2019 | Gupta |
| 2007/0143851 A1 | 6/2007 | Nicodemus et al. |
| 2010/0205123 A1 | 8/2010 | Sculley et al. |
| 2014/0081832 A1 | 3/2014 | Merrill et al. |
| 2015/0379425 A1 | 12/2015 | Dirac et al. |
| 2016/0253801 A1 | 9/2016 | Linard et al. |

(Continued)

OTHER PUBLICATIONS

Raghavrv, "[RFC] Missing values in Random Forest #5870"; Nov. 2015 (Year: 2015).*

(Continued)

*Primary Examiner* — Dawaune A Conyers

(74) *Attorney, Agent, or Firm* — Schwegman Lundberg & Woessner, P.A.

(57) ABSTRACT

A behavior detection module receives a training database and applies a transformation to the attributes that improves the uniformity of the values associated with each attribute. The transformed training database is used to construct a random forest classifier (RFC). The RFC includes a plurality of decision trees and generates a classification label estimate for a data entry with a plurality of attributes. The classification label estimate is determined based on classification estimates from the plurality of decision trees. Each parent node of a decision tree is associated with a condition of a transformed attribute that directs the data entry to a corresponding child node depending on whether the condition is satisfied or not. The data entry is directed through the tree to one out of a set of leaf nodes, and a classification label associated with the leaf node.

20 Claims, 10 Drawing Sheets

(56) References Cited

U.S. PATENT DOCUMENTS

2017/0154282 A1    6/2017    Rossi et al.
2019/0026489 A1*   1/2019    Nerurkar ................ G06N 20/00

OTHER PUBLICATIONS

Schultz, Data Mining Desktop Survival Guide, Jan. 2008 (Year: 2008).*
Cánovas-García, F. et al., "Optimal Combination of Classification Algorithms and Feature Ranking Methods for Object-Based Classification of Submeter Resolution Z/I-lmaging DMC Imagery", Remote Sensing, 2015, pp. 4651-4677, vol. 7, No. 4.
Chakraborty et al., "Spam Mail Filtering Technique using Different Decision Tree Classifiers through Data Mining Approach—A Comparative Performance Analysis," *International Journal of Computer Applications*, vol. 47, No. 16, Jun. 2012, pp. 26-31.
Drummond et al., Exploiting the Cost (ln)jsensitivity of Decision Tree Splitting Criteria, AAAI Technical Report WS-00-05, www.aaai.org, 2000, 8 pages.
Grabczewski, K., "Chapter 2, Techniques of Decision Tree Induction," Studies in Computational Intelligence, Springer, Cham., 2014, 108 pages, vol. 498.
He et al., "Asymmetric Gradient Boosting with Application to Spam Filtering," CEAS, 2007, 9 pages.
Narsky, I. et al., Statistical Analysis Techniques in Particle Physics, Chapter 4: Classification: Basic Concepts, Decision Trees, and Model Evaluation, 2013, 61 pages, [Online] [Retrieved on Mar. 14, 2016] Retrieved from the Internet<URL:https://www-users.cs.umn.edu/~kumar/dmbook/ch4.pdf>.
Tran, Q., "Improving Random Forest Algorithm through Automatic Programming," Østfold University College, May 15, 2015, 126 pages.
United States Office Action, U.S. Appl. No. 14/968,750, filed Nov. 8, 2018, 11 pages.
Zhang et al., "Binary PSO with mutation operator for feature selection using decision tree applied to spam detection," Elsevier, *Knowledge-Based Systems vol. 64*, 2014, pp. 22-31.
Chen, C. et al, "Asymmetric Self-Learning for Tackling Twitter Spam Drift," IEEE, The Third International Workshop on Security and Privacy in Big Data (BigSecurity 2015), 2015, six pages.
Koh, D., "Learning from Asymmetric Models and Matched Pairs," Arizona State University, Dissertation, May 2013, 154 pages.
United States Office Action, U.S. Appl. No. 14/968,754, dated May 15, 2019, nine pages.
United States Office Action, U.S. Appl. No. 14/968,754, dated Nov. 16, 2018, 29 pages.

\* cited by examiner

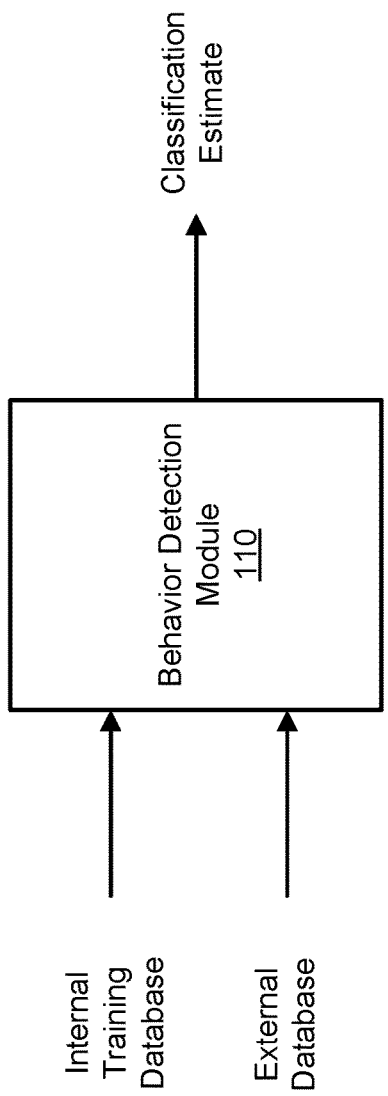

Training Database Before Transformation and Interpolation

| Entry # | Att. 1 (cm) | Att. 2 | | Att. P (yrs) | Label |
|---|---|---|---|---|---|
| 1 | 1003 | England | | 37 | 1 |
| 2 | 360 | England | | ? | 1 |
| 3 | 300 | France | ... | 32 | 1 |
| 4 | 347 | China | | 34 | 1 |
| 5 | 388 | China | | 32 | 0 |
| 6 | 345 | France | | 39 | 0 |
| 7 | 325 | France | | ? | 0 |
| 8 | 9 | England | | 17 | 0 |

Distribution for Attribute 1

Attribute 1

Training Database After Transformation and Interpolation

| Entry # | Att. 1' (u) | Att. 2' (u) |
|---|---|---|
| 1 | 1 | 0.38 |
| 2 | 0.75 | 0.38 |
| 3 | 0.25 | 0.75 |
| 4 | 0.63 | 1 |
| 5 | 0.88 | 1 |
| 6 | 0.5 | 0.75 |
| 7 | 0.38 | 0.75 |
| 8 | 0.12 | 0.38 |

...

| Att. P' (u) | Label |
|---|---|
| 0.83 | 1 |
| 0.25 | 1 |
| 0.5 | 1 |
| 0.67 | 1 |
| 0.5 | 0 |
| 1 | 0 |
| 0.15 | 0 |
| 0.17 | 0 |

Distribution for Attribute 1'

Attribute 1'

FEATURE TRANSFORMATION AND MISSING VALUES

CROSS REFERENCE TO RELATED APPLICATIONS

This application is a continuation of prior, co-pending U.S. application Ser. No. 14/968,754, filed on Dec. 14, 2015, which is incorporated herein by reference in its entirety for all purposes.

FIELD OF DISCLOSURE

The present invention generally relates to classification of database entries, and more specifically to constructing a classifier using a training database with a uniform distribution of data entries.

DESCRIPTION OF THE RELATED ART

Classification of data entries is one of the most useful techniques in data science. Given a series of characteristic attributes of a data entry, classification aims to label the entry into one out of multiple classification labels. For example, an entity running a mail server may want to classify whether an incoming message in a user's inbox is spam or not given a words in the message. As another example, an entity running a website for user transactions may want to classify whether a user is committing fraud on the website given the user's profile, his or her history of transactions, and reviews of the user from other user's on the website.

Well-known classification methods include support vector machines (SVM), naive Bayes classifiers, and random forest classifiers (RFC). A RFC is an ensemble method involving a collection of individual decision trees, and classifies a data entry by testing the entry through a sequence of attribute conditions. Decision trees provide an easy an intuitive way of interpreting the classification of data entries and may be easier to construct than other classifiers of comparable performance.

Each sequence of attribute conditions for a decision tree is determined by a repeated process of partitioning a training database based on various test conditions, and testing each partition to select the one that leads to optimal performance of the classifier. The search process is typically done by generating a grid of reference values and employing a test condition based on each reference value. Often times, this leads to unnecessary waste in computational resources due to non-uniformity or skew of the data entries. On the other hand, decreasing the number of grid points to enhance computational efficiency comes with the cost of sacrificing the accuracy of the classifier.

The training database also includes different attributes based on different units of measurement. For example, one attribute may have values in centimeters (cm), while another may have values in age (years). It is difficult to compare a distance metric for a pair of data entries across different attributes with different units. This is especially problematic when trying to extract similar or neighboring data entries for a data entry based on a distance metric between the entries.

SUMMARY

A behavior detection module receives a training database and applies a transformation to each of the attributes that improves the uniformity of the values associated with each attribute. The transformation may alter the range of the values associated with each attribute, such that the values associated with each transformed attribute are all within the same range. The transformation may also alter the units of the values associated with each attribute, such that the units of the values associated with each transformed attribute are of the same unit. A distance metric is constructed based on the transformation, and missing values of the transformed training database are interpolated using the constructed distance metric.

The interpolated training database is used to construct a random forest classifier (RFC). The RFC includes a plurality of decision trees and generates a classification label estimate for a data entry with a plurality of attributes. The classification label estimate is determined based on classification estimates from the plurality of decision trees. Each parent node of a decision tree is associated with a condition of a transformed attribute that directs the data entry to a corresponding child node depending on whether the condition is satisfied or not. The data entry is directed through the tree to one out of a set of leaf nodes, and a classification label associated with the leaf node.

Each attribute condition that splits a parent node into two child nodes is selected by maximizing an improvement function based on a training database. A plurality of test attribute conditions that correspond to a plurality of splits of the training database is generated. The split that generates the maximum value of an improvement function is selected as the attribute condition for the parent node.

BRIEF DESCRIPTION OF DRAWINGS

FIG. 1A is a block diagram of a behavior detection module according to one embodiment.

FIG. 1B illustrates a general structure of a database entry processed by the behavior detection module.

DETAILED DESCRIPTION

Figures 2A, 2B:
FIG. 2A illustrates an example training database before scaling transformation and interpolation of missing values.
FIG. 2B illustrates the frequency distribution of data entries for an attribute before scaling transformation.

The Figures (FIGS.) and the following description describe certain embodiments by way of illustration only.

One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Overview

FIG. 1A is a block diagram of a behavior detection module 110 according to one embodiment. The behavior detection module 110 receives a training database, applies transformations to attributes of the training database, interpolates missing values in the transformed training database, and constructs a classifier that labels a data entry into one among a set of two or more classification labels based on the interpolated training database, and is one means for doing so. The training database is a collection of data entries, in which each data entry is labeled with a classification label.

The behavior detection module 110 applies the classifier to an external database with a collection of unlabeled data entries, and generates classification label estimates for each entry in the external database. In one particular embodiment, the behavior detection module 110 labels a data entry into one of two classification labels, also referred to as binary classification. It is appreciated, however, that in other embodiments, the behavior detection module 110 may select a classification label from three or more labels.

FIG. 1B illustrates a general structure of a database entry processed by the behavior detection module 110. Each entry has a series of P attributes $x_1, x_2, \ldots x_P$, that characterize the data entry as a unique entry. For example, an entity operating a website that hosts financial user transactions may want to detect fraudulent users. As shown in FIG. 1B, a database of user profiles may contain relevant attributes such as the age, region, gender of a user, as well as whether the user has previously committed fraud, or whether a user has been reported by other users as a fraudulent user.

The attributes in the database may be numerically continuous or discrete values, or categorical values. As shown in FIG. 1B, Attribute 1 is a numerically discrete value indicating for example, whether a user has previously committed fraud (value "1"), or whether a user has never committed fraud (value "0"). Attribute 2 is a categorical value indicating the nationality of the user. Attribute P is a numerically continuous value indicating for example, the age of the user.

A data entry may be associated with one among a set of classification labels, in which each classification label represents a category that is of interest to the entity using the behavior detection module 110. Returning to the example in FIG. 1B, Users 1 and 2 are associated with label "1" that indicates, in a hypothetical use case, that the users are fraudulent users of a computing system (not shown). User 3 is associated with label "0" that indicates for example, that the user is a non-fraudulent user of the computing system.

A classification label for a data entry may be previously verified to be associated with the entry, or may be an estimate of the category associated with the entry. In an internal training database used by the behavior detection module 110 to construct the classifier, each entry may be flagged with a classification label that is already verified to be associated with the entry. In the external database, the detection module 110 may be used to verify classification labels for data entries in the external database.

Returning to the example of user fraud of a computing system, in this example associated with a user transaction website, the human administrator operating the user transaction website may have a list of users that are confirmed to have committed fraud. The entity may label the corresponding user profiles as fraudulent ("1") and include these entries in a training database. In an external database that contains data entries with unknown labels, the behavior detection module 110 may want to infer the labels associated with each user profile entry. For example, given a list of current users, the entity of the user transaction website may want to estimate which users are fraudulent. The entity may, for example, use the estimated labels to monitor certain users for fraudulent activity more than others. Each estimated classification label in the external database is prone to errors, as the behavior detection module 110 cannot always know for certain (without separate, presumed unavailable evidence) that a user is engaging in fraudulent activity.

The behavior detection module 110 constructs the classifier based on attribute patterns that are present in classification labels in the training database. Some attributes may be a more relevant indicator of a classification label than others, and may contribute more in determining whether a data entry is associated with a label. Returning to the example in FIG. 1B, Attribute 1, indicating whether a user has previously committed fraud, may be a stronger indicator than the country of a user in detecting fraudulent users. In one particular embodiment, the classifier is a random forest classifier (RFC). It is appreciated, however, that in other embodiments, the behavior detection module 110 may construct other classifiers.

The behavior detection module 110 may apply a transformation to the training database to improve computational efficiency of training the classifier, or to improve the accuracy of the classifier. Specifically, the behavior detection module 110 applies a transformation that improves the uniformity of the data distribution for a given attribute. Any database entry to be labeled by the classifier is also transformed before the label is estimated by the classifier, since the classifier is trained on a transformed database. As will be discussed below in more detail in conjunction with the behavior detection module 110, often times, improving the uniformity of data entries is helpful in improving the computational efficiency and accuracy of the classifier.

FIG. 2A illustrates an example training database before scaling transformation and interpolation of missing values. As shown in FIG. 2A, the values for Attribute 1 have an uneven or non-uniform frequency distribution, in which a majority of values are concentrated within the range [300, 388]. FIG. 2B illustrates the frequency distribution of data values for Attribute 1 in the example training database of FIG. 2A. As shown in FIG. 2B, if the values of Attribute 1 were plotted as points along a scale, a cluster of points would be concentrated around [300, 388] relative to the whole range of [9, 1003].

Figures 2C, 2D:
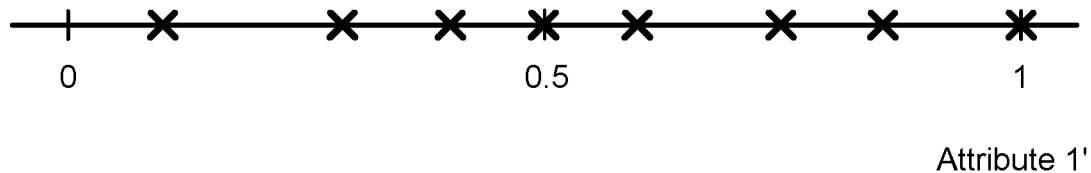
FIG. 2C illustrates an example training database after scaling transformation and interpolation of missing values.
FIG. 2D illustrates the frequency distribution of data entries for an attribute after scaling transformation.

FIG. 2C illustrates an example training database after scaling transformation and interpolation of missing values. As shown in FIG. 2C, the values for transformed Attribute 1' have a distribution with improved uniformity within a new range of [0, 1]. FIG. 2D illustrates the frequency distribution of data values for transformed Attribute 1' in the example training database of FIG. 2C. As shown in FIG. 2D, the values of transformed Attribute 1' do not create a cluster of points around a specific value relative to the new range [0, 1].

The transformed data values may have the same normalized units across different attributes as a result of the transformation applied by the behavior detection module 110. Databases often have entries with a wide range of numerical distances across different attributes due to different units of the attributes. Here, a unit may refer to a predetermined magnitude of a quantity that is defined as a standard of measuring the same quantity. A distance between a pair of entries for a given attribute is a metric function applied to the pair of entry values. A small distance between a pair of data entries may signify a high similarity score between the entries; a large distance between a pair of data entries may signify a low similarity score between the entries. In one embodiment, the distance may be a difference between the pair of entries. In other embodiments, the distance may be a Euclidean norm, $L_1$ norm, or any other norm function on the pair of entries.

Returning to the example in FIG. 2A, the range of values for Attribute 1, which has a unit of centimeters (cm), is [9, 1003] cm; in contrast, the range of values for Attribute P, which has a unit of years (yrs), is [17, 39] yrs. Thus, if each entry is interpreted as a point in a P-dimensional space, where the value of each attribute corresponds to an a dimension or axis in the space, Entry 1 will have a significantly greater distance to Entry 5 along an axis for Attribute 1 (994), compared to a distance along an axis for Attribute P (20). As shown in FIG. 2C, the behavior detection module 110 may apply a transformation in which the transformed attributes Attribute 1', Attribute 2', and Attribute P' are all based on the same unit "u" as a result of the transformation. Due to the transformation, the distance of a pair of entries across different attribute axes may be comparable based on the same unit of measurement.

The transformed data entries may contain values within the same range across different attributes as a result of the transformation applied by the behavior detection module 110. Returning to the example in FIG. 2C, Attribute 1', Attribute 2', and Attribute P' all contain values within the range [0, 1].

The behavior detection module 110 may also apply a transformation that is invertible. That is, a one-to-one map exists between values of the transformed attribute and values of the original attribute such that a value for a transformed attribute can be directly mapped back to a value for the original attribute. Returning to the example in FIGS. 2A and 2C, the value 1003 of Attribute 1 can be mapped to the value 1 of transformed Attribute 1', and vice versa. In other words, no two different values in the original training database is mapped to the same value in the transformed training database, and no two different values in the transformed training database is mapped to a same value in the original training database.

The behavior detection module 110 may also use the transformed training database to interpolate missing values in the training database. Returning to the example in FIG. 2A, Entry 2 contains a missing value in Attribute P of the database. Although such incomplete data entries may be deleted by the behavior detection module 110 when training the classifier, the missing values may instead be interpolated based on other entries close in distance to Entry 2. For example, as shown in FIG. 2C, the missing value for attribute P of Entry 2 has been interpolated with the value 0.25 in the transformed database, based on a neighborhood of data entries within a predetermined distance from Entry 2. The interpolated version of Entry 2 may be retained in the training database, such that the information contained in Entry 2 is still used to construct the classifier. As more information is retained in the training process, the behavior detection module 110 constructs a classifier with improved accuracy when using the interpolated training database compared to using a training database with discarded entries.

Behavior Detection Module

Figure 3:
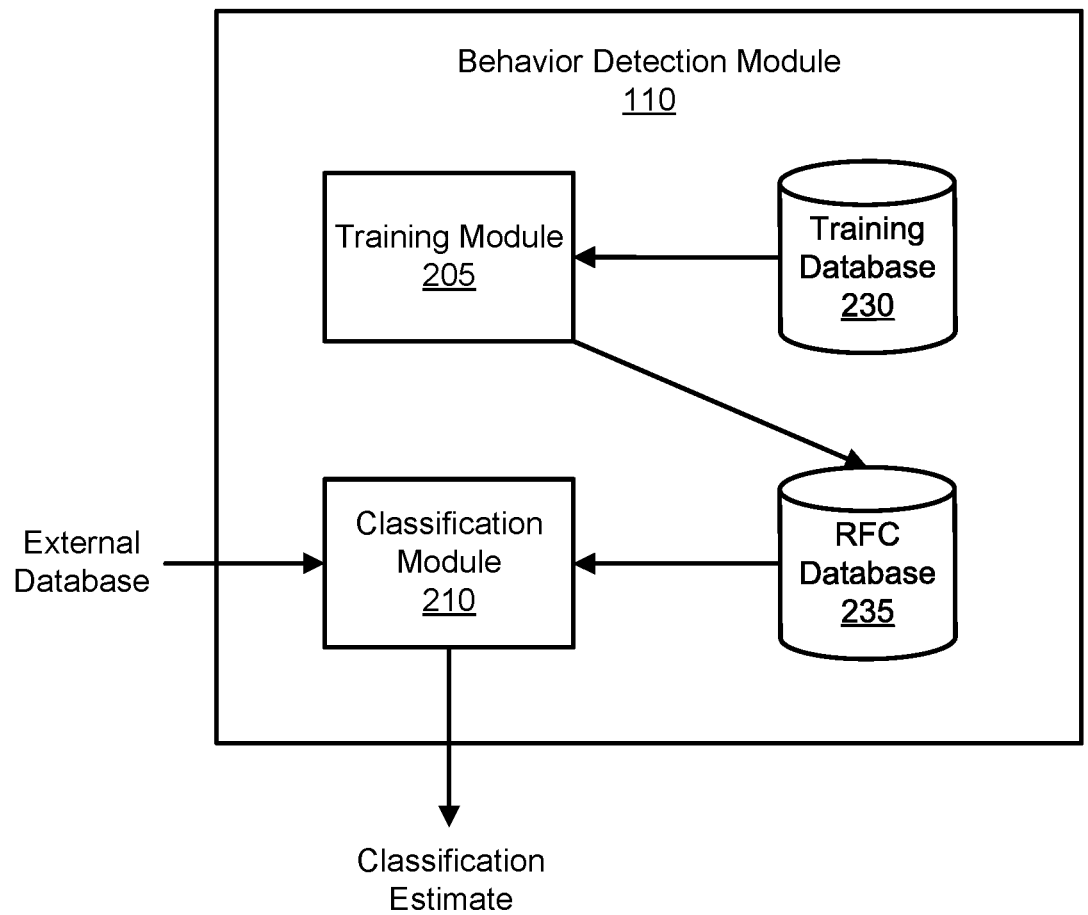
FIG. 3 is a block diagram illustrating modules within the behavior detection module, according to one embodiment.

FIG. 3 is a block diagram illustrating modules within the behavior detection module 110 according to one embodiment. The behavior detection module 110 includes a training module 205, a classification module 210, training data 230, and an RFC database 235. Some embodiments of the behavior detection module 110 have different or additional modules than the ones described here. Similarly, the functions can be distributed among the modules in a different manner than is described here. Certain modules and functions can be incorporated into other modules of the behavior detection module 110.

The training module 205 receives the training database 230, applies a transformation to attributes of the training database 230 and generates a transformed training database, and is one means for doing so. The training module 205 interpolates missing values in the transformed training database, generates a random forest classifier (RFC) using the transformed training database, and stores the RFC in RFC database 235. The training module 205 is described below with respect to FIG. 4.

The classification module 210 applies the trained RFC in RFC database 235 to an external database and generates a classification estimate for each entry in the external database, and is one means for doing so. Prior to applying the trained RFC, the classification module 210 transforms the attributes of the external database. The external database includes entries without known classification labels. The classification module 210 is described further in Section "Classification Using the Trained RFC."

Training Module

Figure 4:
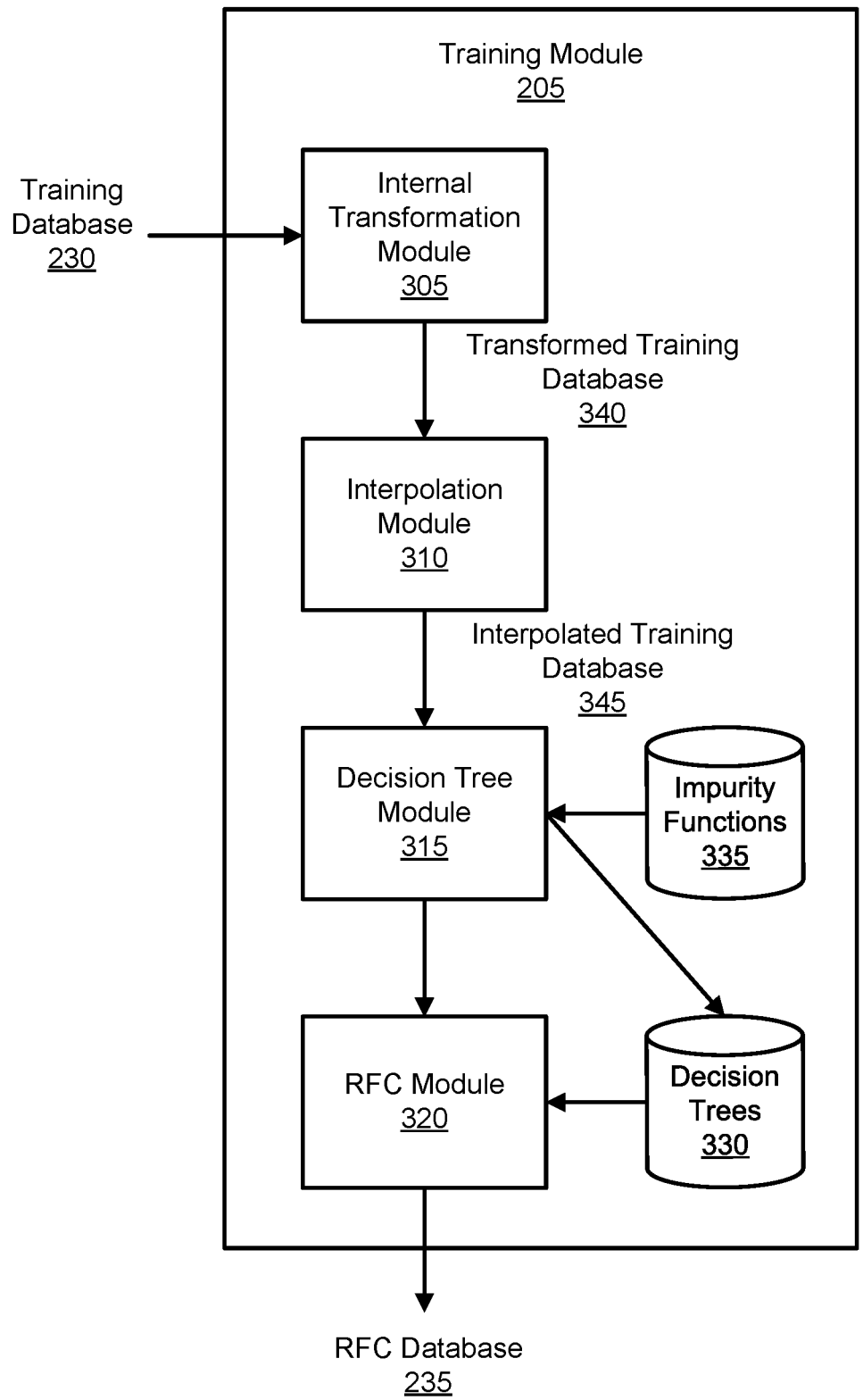
FIG. 4 is a block diagram illustrating the training module implemented by the behavior detection module, according to one embodiment.

FIG. 4 is a block diagram illustrating the training module 205 implemented by the behavior detection module 110, according to one embodiment. The training module 205 includes an internal transformation module 305, an interpolation module 310, a decision tree module 315, a RFC module 320, decision trees 330, and impurity functions 335. Some embodiments of the training module 205 have different or additional modules than the ones described here. Similarly, the functions can be distributed among the modules in a different manner than is described here. Certain modules and functions can be incorporated into other modules of the training module 205.

Scaling Transformations

The internal transformation module 305 applies a transformation to entries associated with an attribute of the training database 230 such that the transformed entries for the attribute have data frequency distributions with improved uniformity compared to the entries before the transformation, and is one means for doing so. The internal transformation module 305 generates the transformed training database 340 and provides it to the interpolation module 310. In one particular embodiment, the transformation is a mapping from a value associated with an attribute to a probability function of the value. In such a case, the unit of measurement is a probability, which has a numerical value within a range [0, 1]. As described below in conjunction with the decision tree module 315, the transformation allows a more computationally efficient search for relevant attributes in constructing the classifier.

The internal transformation module 305 is configured to transform both attributes with numerical values and attributes with categorical values. The transformation applied by the internal transformation module 305 may alter various statistical properties of the data entries. For example, the range or variance of the data entries for a given attribute may be re-scaled as a result of the transformation.

The internal transformation module 305 may apply transformations to each and every attribute in the training database 230 or may apply transformations to a subset of attributes. The internal transformation module 305 may also apply different types of transformations to different attributes. For example, the internal transformation module 305 may apply the transformation given below in Equation 1 to Attribute 2, and may apply the transformation given below in Equation 3 to Attribute 5. Various embodiments of the transformation will be discussed in more detail below.

The internal transformation module 305 may apply the following transformation in Equation 1:

$$c_i \rightarrow F_i(c_i) := P(X_i \leq c_i)$$

to transform data entries for numerical attribute $x_i$. $X_i$ is a random variable representing possible values of attribute $x_i$, and $c_i$ are numerical values that $X_i$ may take on. For a given value $c_i$ of attribute $x_i$, the transformation above maps $c_i$ to the probability that $X_i$ is less than or equal to $c_i$. In other words, the transformation maps $c_i$ to how likely a value generated from the underlying data distribution of attribute $x_i$ is less than or equal to $c_i$. Since the true distribution of $X_i$ is unknown, the internal transformation module 305 may empirically estimate $P(X_i \leq c_i)$ using the empirical distribution of the training database 230. For example, the internal transformation module 305 may transform a data value in training database 230 to a value between 0 and 1 indicating the proportion of data entries that have a value equal to or less than the data value. Returning to the example in FIG. 2A, Attribute 1 of Entry 3 has a $c_i$ value of 300. The internal transformation module 305 applies the mapping 300→$F_1$(300):=$P(X_1 \leq 300)$ by empirically estimating $P(X_1 \leq 300)$ to be 6/8=0.75, as there are 6 entries with values equal to or less than 300 for Attribute 1.

The internal transformation module 305 may also apply the following transformation in Equation 2:

$$c_i = F_i(c_i) := P(X_i \leq c_i | Y=y)$$

to transform data entries for numerical attribute $x_i$, where y denotes one out of the set of classification labels. The transformation in Equation 2 maps $c_i$ to the probability that $X_i$ is less than or equal to $c_i$, given that the values of $X_i$ are generated from the underlying data distribution of attribute $x_i$ that are associated with classification label y. The internal transformation module 305 may estimate $P(X_i \leq c_i | Y=y)$ by using the empirical distribution of the training database 230 with a classification label y. That is, the internal transformation module 305 may transform a data value in training database 230 to a value between 0 and 1 indicating the proportion of data entries that have a value less than or equal to the data value, in which the proportion is calculated within a subset of the training database 230 that contain data entries with classification label y. Returning to the example in FIG. 2A for Entry 3, Attribute 1, the internal transformation module 305 applies the mapping 300→$F_1$(300):=$P(X_1 \leq 300 | Y=1)$ by empirically estimating $P(X_1 \leq 300 | Y=1)$ to be 2/4=0.5, as there are 2 entries with values equal to or less than 300 out of the 4 entries associated with classification label "1." As another example, the internal transformation module 305 applies the mapping 78→$F_1$(78):32 $P(X_1 \leq 78 | Y=1)$ by empirically estimating $P(X_1 \leq 78 | Y=1)$ to be 1/4=0.25, as there is only 1 entry with values equal to or less than 78 out of the 4 entries associated with classification label "1."

The internal transformation module 305 may apply the following transformation in Equation 3:

$$c_i = F_i(c_i) := P(X_i \preceq c_i)$$

to transform data entries for categorical attribute $x_i$. $X_i$ is a random variable representing entries of attribute x, and $c_i$ are categorical labels that $X_i$ may take on. The internal transformation module 305 may take an ordering $\preceq$ on the set of categorical labels $c_i$ may take on, and empirically estimate $P(X_i \preceq c_i)$ using training database 230. Returning to the example in FIG. 2A, Attribute 2 of Entry 1 has a value of "England." For the ordering "China ≺ England ≺ France," the internal transformation module 305 applies the mapping England→$F_2$(England):=$P(X_2 \preceq \text{England})$ by empirically estimating $P(X_2 \preceq \text{England})$ to be 5/8=0.625, as 5 entries have a value of "China" or "England."

The internal transformation module 305 may also apply the following transformation in Equation 4:

$$c_i \rightarrow F_i(c_i) := P(X_i \preceq c_i | Y=y)$$

to transform data entries for categorical attribute $x_i$, where Y denotes one out of the set of classification labels. The transformation in Equation 4 maps $c_i$ to the probability that $X_i$ is ordered below $c_i$, given that the values of $X_i$ are generated from the underlying data distribution of attribute i that belong to classification label y. The internal transformation module 305 may estimate $P(X_i \leq c_i | Y=y)$ by using the empirical distribution of training database 230 with a classification label of y. That is, the internal transformation module 305 may transform a data value in training database 230 to a value between 0 and 1 indicating the proportion of data entries that have a categorical label ordered below the data value, in which the proportion is calculated within a subset of the training database 230 that contain data entries with classification label y. Returning to the example in FIG. 2A for Attribute 2, Entry 1, the internal transformation module 305 applies the mapping England→$F_2$(England):=$P(X_2 \preceq \text{England} | Y=1)$ by empirically estimating $P(X_2 \preceq \text{England} | Y=1)$ to be 3/4=0.75, as 3 entries have a value of "China" or "England" out of the 4 entries associated with classification label "1."

For categorical attributes, the internal transformation module 305 may order the categories of $c_i$ based on the proportion of entries that have a specific classification label y within each category. Returning to the example in FIG. 2A, the internal transformation module 305 may order categories of Attribute 2 based on the proportion of entries associated with label "1" for each category. The internal transformation module 305 may select the ordering "England ≺ China ≺ France" since the proportion of entries associated with label "1" is 2/3=0.67 for "England," 1/2=0.5 for "China," and 1/3=0.33 for "France."

The internal transformation module 305 may ignore missing data values contained in attribute $x_i$ when empirically estimating the probabilities $P(X_i \leq c_i)$, $P(X_i \leq c_i | Y=y)$, $P(X_i \preceq c_i)$, $P(X_i \preceq c_i | Y=y)$ for the transformations in Equations 1-4 above.

Figure 5A:
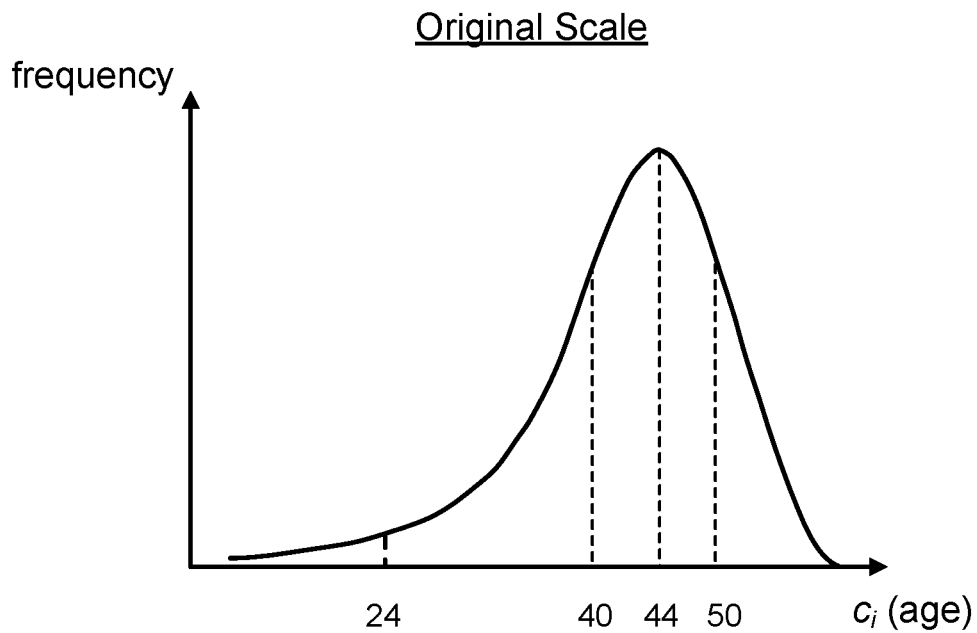
FIG. 5A illustrates an example frequency distribution of an attribute before scaling transformation.
Figure 5B:
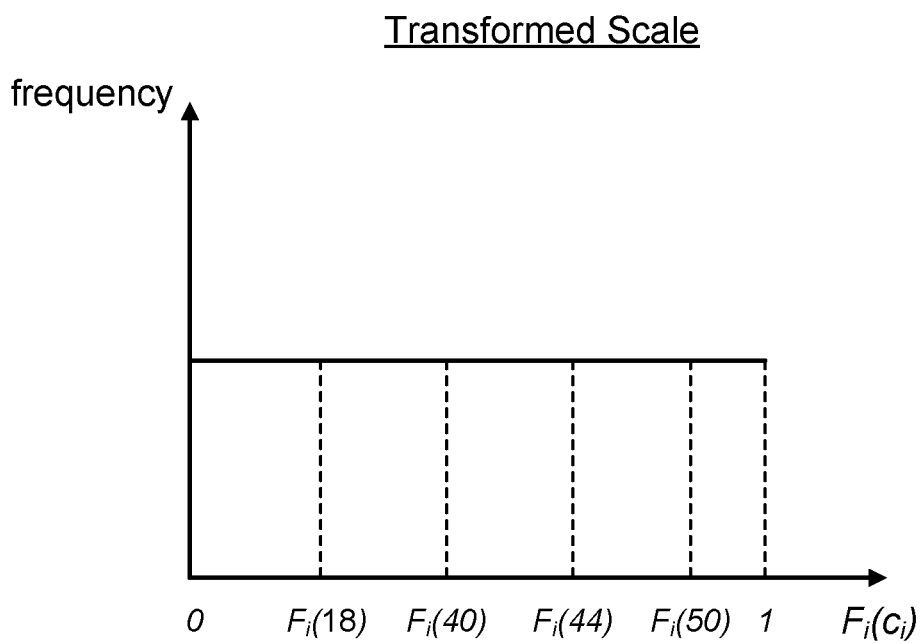
FIG. 5B illustrates an example frequency distribution of an attribute after scaling transformation.

FIG. 5A illustrates an example data distribution of an attribute before scaling transformation. FIG. 5B illustrates an example data distribution of an attribute after scaling transformation.

The distribution of data entry frequencies for an attribute "age" before transformation by the internal transformation module 305 is shown in FIG. 5A. Most of the entries belong to an age group between 40 to 50 years, resulting in a skewed distribution of values. The points at age 24, 40, and 44 are selected such that the frequency of entries between 24 to 40 and 40 to 44 are equal. However, one interval has a distance of 16, while the other has a distance of 4.

The distribution of data entry frequencies for an attribute "age" after transformation by the internal transformation module 305 is shown in FIG. 5B, using the transformation given in Equation 1 or Equation 3 for numerical attributes. The data entries are now distributed uniformly across the transformed values $F_i(c_i)$ for attribute "age." Moreover, the distance between the transformed values $F_i(24)$ and $F_i(40)$, $F_i(40)$ and $F_i(44)$ are equal. Thus, after the transformation, the distance between two entries with values p and q for attribute $x_i$, respectively, indicate the probability of observing an entry with a value in between the range [p, q] for attribute $x_i$. In other words, a pair of data entries with a distance of 0.4 for attribute $x_i$ contains twice the frequency of data entries within that distance than a pair of data entries with a distance of 0.2.

The transformed attributes generated with Equations 1-4 above contain values within the range [0, 1] based on a unit of probability. Since the distance between a pair of transformed values is directly related to the proportion of entries with attribute values within that distance, the frequency of the transformed values for an attribute are uniformly distributed. Moreover, all transformations in Equations 1-4 are invertible mappings.

Returning to FIG. 4, the internal transformation module 305 receives the training database 230, applies a transformation to each of the attributes, and generates a transformed training database 340. The transformed training database 340 is provided to the interpolation module 310 for interpolation of missing values.

Interpolation of Missing (Unknown) Data Entries

The interpolation module 310 interpolates missing values in the transformed training database 340 based on other entries close in distance to the entry with the missing value, and is one means for doing so. The interpolation module 310 constructs a distance metric for a pair of data entries that indicate a similarity between the two entries. The interpolation module 310 interpolates a missing value of an entry based on a subset of neighboring entries that have a distance metric lower than a predetermined threshold with respect to the entry with the missing value. In one embodiment, the distance metric constructed by the interpolation module 310 may depend on the number of missing values between a pair of data entries. For example, a pair of data entries with significantly many missing values may have a greater distance metric than a pair of data entries with fewer missing values.

The interpolation module 310 may construct the following distance metric d(·) in Equation 5:

$$d(a, b; \lambda) := \sum_{i=1}^{P} [\lambda + 1_{a_i \neq NULL, b_i \neq NULL}(|F_i(a_i) - F_i(b_i)| - \lambda)]$$

where $a_i$ and $b_i$ are values of attribute $x_i$ for data entry vectors a and b, respectively, $F_i(a_i)$ and $F_i(b_i)$ are the transformed values of $a_i$ and $b_i$ by the internal transformation module 305, and $\lambda$ is a predetermined constant that determines the distance between a pair of entries when a value for at least one of the attributes is missing. The distance metric between a pair of entries for attribute $x_i$ is given by $F_i(a_i)-F_i(b_i)$ when none of $a_i$ and $b_i$ contain missing values. The distance metric is given by $\lambda$ when at least one of $a_i$ and $b_i$ are missing values. Thus, a higher value of $\lambda$ penalizes a greater distance metric between a pair of data entries when an attribute contains a missing value.

The interpolation module 310 may determine the interpolated value $m(a_j; d, k)$ for a missing data value $a_j$ by the following in Equation 6:

$$m(a_j; d, k) := \mathrm{median}([\mathrm{argmin}_{b \in D}^{(k)} d(a, b, \lambda)]_j)$$

where k is a predetermined constant that corresponds to the number of neighboring data entries used to determine $m(a_j; d, k)$, and b is any data entry in the training database D. The interpolation module 310 first determines the k nearest neighbors closest to data entry a based on the distance metric d(·). The interpolation module 310 then determines the median value $m(a_j; d, k)$ of attribute $x_j$ among the selected neighbors. In other embodiments, the interpolation module 110 may use the mean, weighted average, or mode of the values of attribute $x_j$ among the selected neighbors. The missing value $a_j$ is replaced with $m(a_j; d, k)$ in the transformed training database 340.

The interpolation module 310 receives the transformed training database 340, estimates interpolated values for missing values in the database, and generates an interpolated training database 345 by substituting missing values with interpolated values in the transformed training database 340. The interpolated training database 345 is provided to the decision tree module 315 for training of individual decision trees.

Decision Tree Module

The decision tree module 315 receives the interpolated training database 345, trains a plurality of binary classification trees based on the received database, and stores them in decision trees 330, and is one means for doing so. In one particular embodiment, the decision tree module 315 trains at least two and commonly many more binary decision trees. The decision trees are distinct depending on for example, the size of the tree, the type and number of attributes used in constructing the tree. The decision tree module 315 uses one or more impurity functions 335 to construct each decision tree from the interpolated training database 345. The impurity functions 335 measures the degree of separation between partitions of the interpolated training database 345 according to the distribution of classification labels in each partition. For example, a partition of the database with equal proportions of "0" and "1" labeled entries would have a higher impurity than a partition with all "1" labeled entries.

The training process and construction of an individual decision tree is described further in Section "Decision Tree Example."

Decision Tree Example

Figure 6:
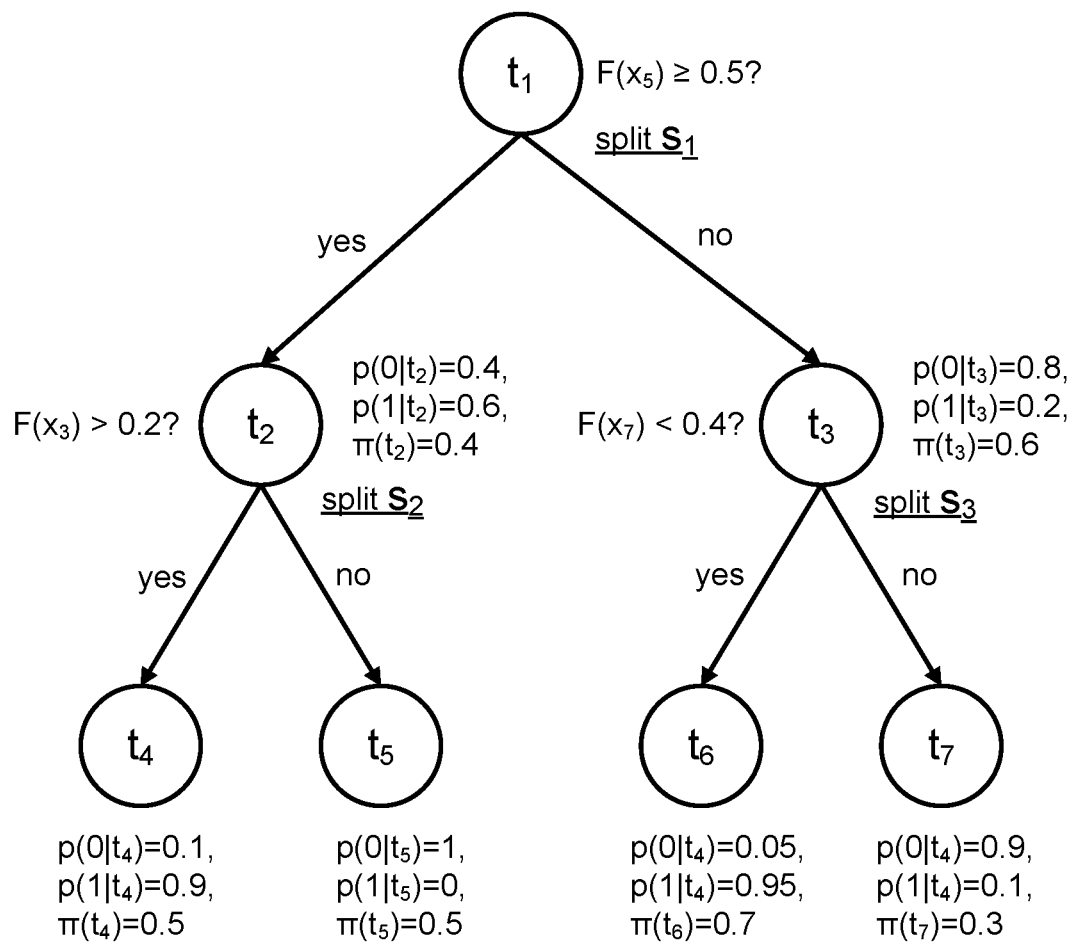
FIG. 6 is an example diagram of training a decision tree, according to one embodiment.

FIG. 6 is an example diagram of training a decision tree, according to one embodiment. Each decision tree includes a hierarchical structure with a plurality of T nodes $t_1$, $t_2$, . . . , $t_T$ and a plurality of directed edges between a parent node and a child node. A parent node is a node that has outgoing edges to a child node, and a child node is a node that receives edges from a parent node. In the particular embodiment of a binary decision tree, each parent node has two child nodes. The nodes are one among a root node, in which the node has no incoming edges, an internal node, in which the node has one incoming edge with two outgoing edges, and a leaf node, in which the node has one incoming edge with no outgoing edges. For example, the example decision tree in FIG. 6 has seven nodes $t_1, t_2, \ldots t_7$ and six edges. $t_1$ is the root node, $t_2$ and $t_3$ are internal nodes, and $t_4$-$t_7$ are leaf nodes.

Each node except the root node corresponds to a partition of database entries formed by a split s at a parent node. The split s at the parent node is based on a test condition of a transformed attribute of the interpolated training database 345 that compares an value of an entry for an attribute to a reference value, and verifies whether the attribute value meets that condition or not. Returning to the example in FIG. 6, node $t_1$ creates a split $s_1$ into two child nodes $t_2$ and $t_3$ based on the test condition $F(x_5) \geq 0.5$, which checks if an entry contains a transformed Attribute 5 value equal to or greater than 0.5. The database 345 is split at $s_1$ into one partition that contains entries with $F(x_5) \geq 0.5$, and another partition that contains entries with $F(x_5) < 0.5$. The former partition is directed to child node $t_1$ and the latter partition is directed to child node $t_2$. As described below, the decision tree module 315 may try various test conditions to select the optimal partition of the database at the parent node. As shown in FIG. 6, if the condition $F(x_5) \geq 0.5$ at the parent node $t_1$ is determined to be optimal for that layer of the decision tree, the partition of the interpolate training database 345 with the condition $F(x_5) \geq 0.5$ is further split at $s_2$ into two child nodes $t_4$ and $t_5$, based on the test condition $F(x_3) \geq 0.2$. Thus, the entries at the node $t_4$ would satisfy both conditions $F(x_5) \geq 0.5$ and $F(x_3) > 0.2$.

The decision tree module 315 generates a layer of child nodes at a parent node by determining an optimal condition of an attribute that maximizes an improvement function at the split s of the parent node. The optimal condition is in general, one where one partition predominantly has entries with one classification label (e.g., "0"), and the other partition predominantly has entries with the other classification label (e.g., "1"). The decision tree module 315 generates various partitions of the database 345 based on various attribute test conditions, calculates an improvement metric from the improvement function, and selects the attribute condition with the highest improvement metric as the condition for the split s.

Returning to the example in FIG. 6, the decision tree module 315 at node $t_1$ may generate various test partitions based on $F(x_5) \geq 0.5$, as well as $F(x_5) \geq 0.55$, $F(x_5) \geq 0.60$, $F(x_5) \geq 0.65$, and so on, by generating a series of reference values in predetermined intervals. The test partition that maximizes the improvement function is chosen as the condition for split $s_1$ of the tree. In one embodiment, the decision tree module 315 may randomly select a subset of attributes and generate test partitions based on the subset of selected attributes. In another embodiment, the decision tree module 315 may use a dimensionality reduction method such as principal component analysis (PCA) to combine attributes and use the combined attributes to construct the decision tree.

The improvement function quantifies the gain in separation of classification labels by further splitting a subset of the database 345 at a parent node into child nodes, according to a test condition. The improvement function is based on an impurity function that measures the "purity" of a test partition, or how predominant one classification label is among the entries in the partition. The impurity function retains a low value when a partition includes a high proportion of entries from one classification label. Returning to the example in FIG. 6, $p(0|t)$ denotes the proportion of entries at node t with classification label "0," and $p(1|t)$ denotes the proportion of entries at node t with classification label "1." Node $t_5$ predominantly has entries with classification label "0," and retains a very low degree of impurity. In contrast, node $t_2$ has a higher degree of impurity since the partition contains an almost equal combination of entries with both classification labels "0" and "1."

The decision tree module 315 completes the construction of a trained decision tree when it determines the leaf nodes of the decision tree. Each leaf node is associated with a classification label. The decision tree module 315 may stop generating child nodes in the tree when the maximum of an improvement function for a split is less than a predetermined threshold, and select the last layer of nodes as the leaf nodes. As another example, the decision tree module 315 may generate a large decision tree with many layers and use a validation database to reduce or prune the size of the tree. Each leaf node is assigned a classification label that has a dominant proportion in the corresponding partition at the leaf node. In FIG. 6, leaf node $t_4$ is assigned label "1," since $p(1/t_4)$ is greater than $p(1|t_4)$ in the partition at node $t_4$. As will be discussed in further detail later in conjunction with the classification module 210, an external data entry to be labeled is assigned to one of the leaf nodes, and the classification label associated with the leaf node.

The improvement function $\Delta i(s,t)$ for a test partition at node t for a split s may be given by:

$$\Delta i(s,t) = i(t) - \pi(l) \cdot i(l) - \pi(r) \cdot i(r)$$

where $i(t)$ is the impurity function for node t, $i(l)$ is the impurity function for the potential left child node of node t, $i(r)$ is the impurity function for the potential right child node of node t, $\pi(l)$ is the proportion of data entries sent to the left node from node t, and $\pi(r)$ is the proportion of data entries sent to the right node from node t. The improvement function above measures the decrease in impurity if a subset of the interpolated training database 345 at node t were to be split at s into child nodes l and r. The improvement function $\Delta i(s,t)$ is maximized when the impurity function of the potential left and right child nodes are minimized. In other embodiments, the improvement function may be given by other impurity function-based functions, such as information gain, likelihood ratio, gain ratio, distance measure, and the DKM criterion, etc.

The impurity function $i(t)$ for a partition at node t may be given by the symmetric Gini impurity $i_G(t)$:

$$i_G(t) = p(0|t) \cdot (1 - p(0|t)) + p(1|t) \cdot (1 - p(1|t)).$$

Figure 7:
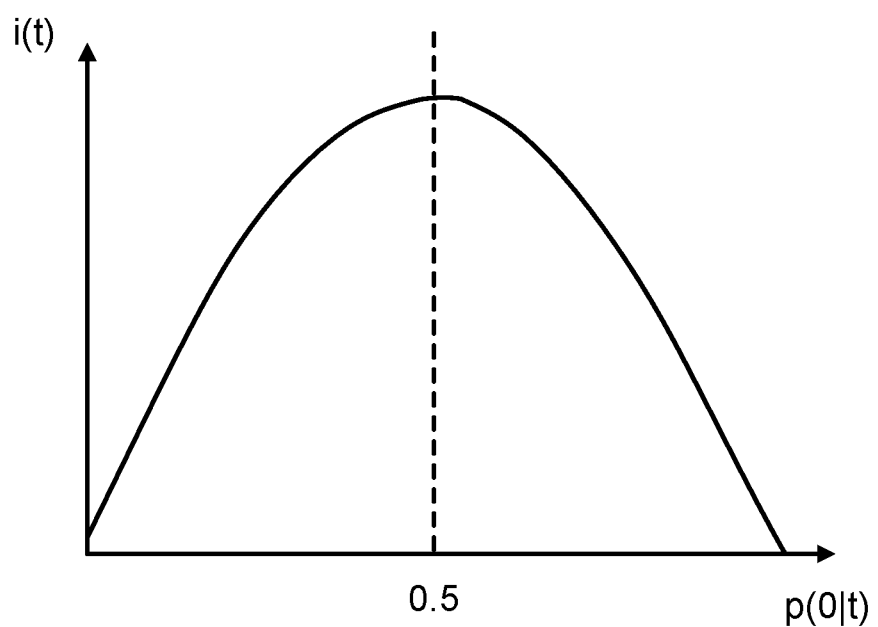
FIG. 7 illustrates a symmetric Gini impurity function, according to one embodiment.

FIG. 7 conceptually illustrates a symmetric Gini impurity function. As shown in FIG. 7, the Gini impurity is a symmetrical function and retains a maximum value when $p(0|t) = p(1|t) = 0.5$, or when there is an equal proportion of entries from each classification label assigned to each child node. Returning to the example decision tree in FIG. 6, node $t_2$ has a higher Gini impurity than node $t_3$, since $i_G(t_2) = 0.48$ and $i_G(t_3) = 0.32$. In other embodiments, the decision tree module 315 may use other functions, such as log entropy or the misclassification rate, as the impurity function.

The decision tree module 315 is designed to split the subset of the database 345 at a parent node t so the left child node corresponds to a partition with a predominant proportion of one classification label, and the right child node corresponds to a partition with a predominant proportion of the remaining classification label. Thus, maximizing the quality function $\Delta i(s,t)$ at a split s generally corresponds to one child node having an impurity metric on a left end of the impurity function, and another child node having an impurity metric on a right end of the impurity function.

As mentioned above in conjunction with the internal transformation module 305, the transformation applied by the internal transformation module 305 may enhance the computational efficiency of training a decision tree by decreasing the search time for the optimal partition at a split s. The applied transformation may also enhance the accuracy of the decision tree by allowing the decision tree module 315 to search through a finer set of test partitions. As described above in conjunction with FIG. 6, the decision tree module 315 may generate a series of reference values in predetermined intervals to generate various attribute test conditions when searching for the optimal partition of the training database.

A training database without the applied transformation by the interpolation module 305 may generate multiple test partitions with little or no gain in information. Returning to the example in FIG. 2B, test partitions for Attribute 1 based on a series of reference values in the range [388, 1003], e.g. $x_1>500$, $x_1>505$, $x_1>510$, etc., would generate no information, as the generated test partitions would be identical due to the non-uniformity of the data entry distribution. Increasing the predetermined interval for the series of reference values to decrease the search time in the range [388, 1003] would also be insufficient, as the interval is required to be small enough to generate partitions with reference values in the range [300, 388], which includes a majority of the training database entries. As shown in FIG. 2B, an interval of 13 would generate all possible partitions of the database but would require approximately 77 searches through the interval [9, 1003]. Thus, non-uniform data distributions may cause increased search time and/or decreased sensitivity when the decision tree module 315 performs a search for the optimal partition.

Returning to the example in FIG. 2D, test partitions based on a series of transformed reference values for Attribute 1' provides a solution to the problems in search time and sensitivity described above. Since the frequency distribution of the entries has improved uniformity, and a distance between a pair of data entries is directly related to the proportion of data entries within the range specified by the pair of entries, the decision tree module 315 may set an interval for the reference values that provides reasonable search time and sensitivity. As shown in FIG. 2D, an interval of 0.1 generates all possible partitions of the transformed training database with only 10 searches through the range [0, 1], compared to the 77 searches performed in the example for FIG. 2B.

RFC Module

Returning to FIG. 4, the RFC module 320 requests a plurality of decision trees from the decision tree module 315, generates a random forest classifier (RFC), and stores the RFC in RFC database 235, and is one means for doing so. Each of the plurality of decision trees requested by the RFC module 320 may be unique in terms of the size of the tree and attribute conditions at nodes of the tree. The RFC labels a data entry by generating a plurality of classification label estimates from each of the plurality of decision trees and determining a final label estimate based on the plurality of classification label estimates. In one embodiment, the RFC module 320 may determine the final estimate by taking the majority vote of the plurality of binary classification trees. For example, a data entry would be estimated as label "0" if over half of the plurality of binary classification trees voted "0" as the label estimate. In another embodiment, the RFC module 310 may impose different weights between each of the plurality of classification label estimates, such that a vote from one decision tree is overweighed compared other trees.

Classification Module

Figure 8:
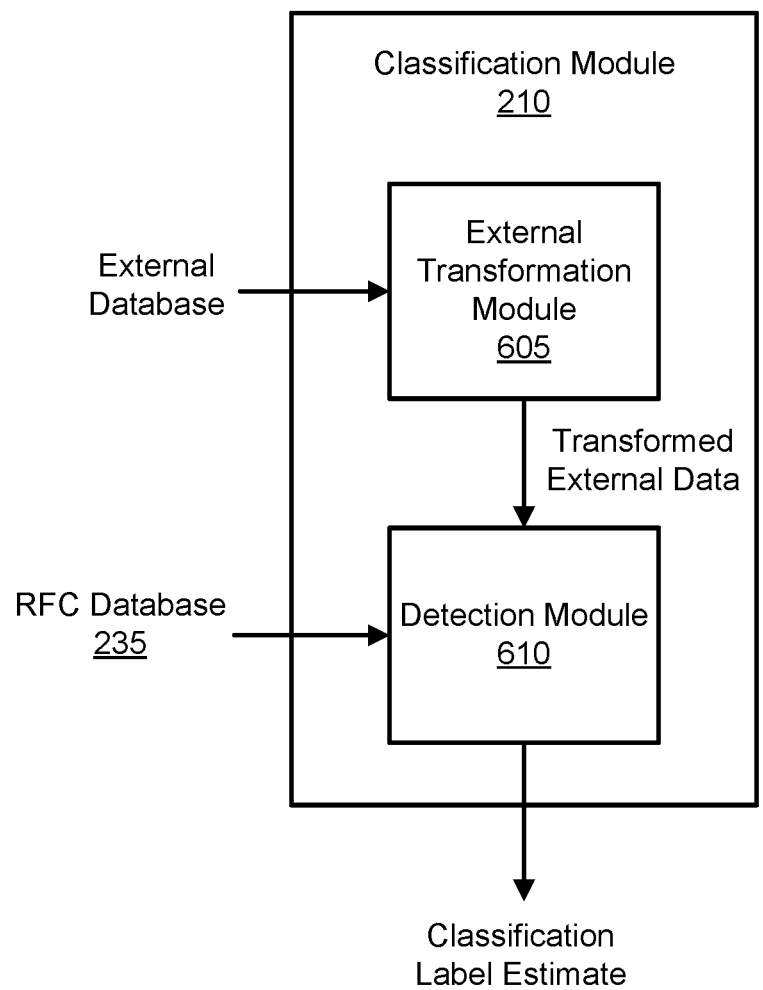
FIG. 8 is a block diagram illustrating a classification module implemented by the behavior detection module, according to one embodiment.

FIG. 8 is a block diagram illustrating a classification module implemented by the behavior detection module, according to one embodiment. The classification module 210 includes an external transformation module 605, and a detection module 610. Some embodiments of the classification module 210 have different or additional modules than the ones described here. Similarly, the functions can be distributed among the modules in a different manner than is described here. Certain modules and functions can be incorporated into other modules of the classification module 210.

The external transformation module 605 receives an external database entry without a known classification label, transforms values of the external entry based on the transformation applied by the internal transformation module 305, and provides the transformed external entry to the detection module 610, and is one means for doing so. As described above in section "Scaling Transformations," if a transformation was not applied to an attribute in the training database 230, a transformation is not applied to the corresponding attribute in the external database entry. On the other hand, if a transformation was applied to an attribute in the training database 230, the external transformation module 605 performs the same type of transformation to the corresponding attribute in the external database entry. For example, given that an external database has a value $b_i$ for attribute $x_i$, and given that the internal transformation module 305 applied the transformation in Equation 1 to the training database 230 for attribute $x_i$, the external transformation module 605 transforms $b_i$ by estimating $P(X_i \leq b_i)$ using the empirical distribution of the training database 230.

Figure 9:
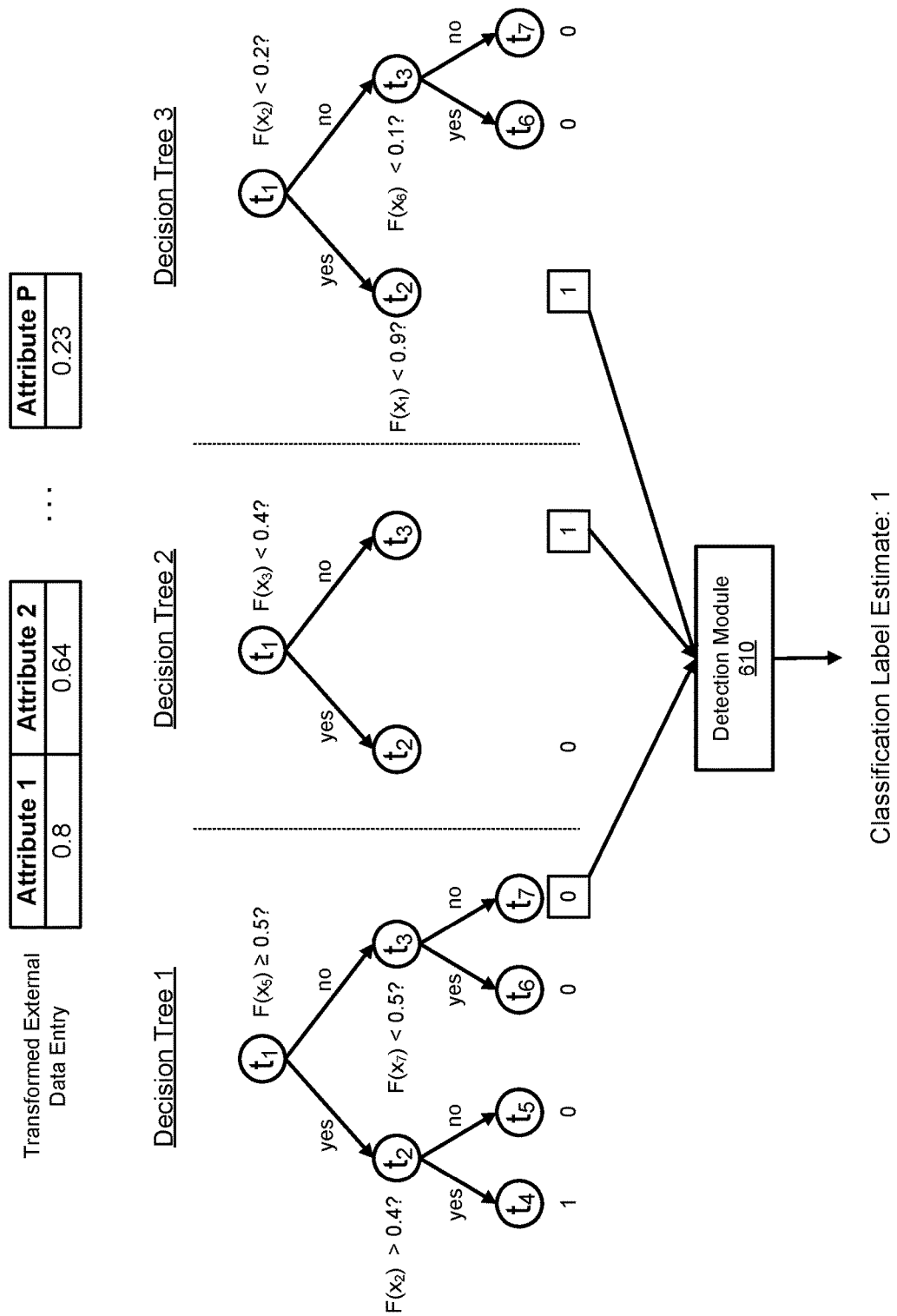
FIG. 9 illustrates classification of an external database entry by the classification module, according to one embodiment.

The detection module 610 receives the transformed external entry and generates a classification label estimate for the entry by applying the trained RFC stored in RFC database 235, and is one means for doing so. FIG. 9 illustrates classification of an external database entry by the detection module 610, according to one embodiment. The example RFC shown in FIG. 9 has three different decision trees, in terms of the number of nodes and selected attribute conditions. The detection module 610 generates a plurality of classification label estimates from the plurality of decision trees by applying each decision tree to the external database entry. For example, as shown in "Decision Tree 1," selected attribute conditions are checked at each node as the transformed external data entry propagates through the tree to a destination leaf node $t_7$. The classification label "0" associated with the destination leaf node $t_7$ is selected as the classification label estimate for "Decision Tree 1." The detection module 610 aggregates the label estimates for each tree and generates a final estimate depending on the voting method in the trained RFC. As shown in FIG. 9, the detection module 610 generates an estimate of "1," since the majority of the decision trees voted a label estimate of "1."

Fraud Example Use Case

The behavior detection module 110 may be used in the context of user fraud, in which a classifier is used to determine whether a user of a computing system is fraudulent or not. For example, in a website where users generate financial transactions between each other in exchange for products and services, fraud may occur in the form of identity theft, in which a fraudulent user inappropriately accesses another user's account information, rental fraud, in which a fraudulent user requests a monetary sum upfront without providing the product or service later on, in addition to many others.

An entity running the transaction website may apply the behavior detection module 110 to determine whether a user is fraudulent given a series of attributes associated with the user that are relevant indicators of fraud. For example, such attributes may be whether the user has previously engaged in fraudulent activity, number of financial transactions, number of accounts associated with the user, reviews of the user by other user's on the website, etc. In many cases, such attributes contain data entries with a significantly non-uniform frequency distribution. For example, a majority of users may use the website sporadically and may have a significantly small number of transactions, while a select few use the website regularly and have a significantly large number of transactions.

The behavior detection module 110 may be useful when dealing with such databases with non-uniform data entry distributions for detecting fraudulent users in terms of speeding up the training process of the classifier as well as increasing the accuracy of the classifier.

Other Considerations

In the behavior detection module 110, the program code and modules implementing the functionality described herein are not native components of underlying machine or system, and thus extend the operations and functionality thereof beyond their generic functions and capabilities. The behavior detection module 110 includes a training database 230, a RFC database 235, a transformed database 340, an interpolated database 345, impurity functions 335, and decision trees 330. Those of skill in the art will appreciate that these databases, information, and data structures are not components of a generic database, and that the behavior detection module 110 may contain other databases that are not explicitly mentioned here. Additionally, the operations listed here are necessarily performed at such a frequency and over such a large set of data that they must be performed by a computer in order to be performed in a commercially useful amount of time, and thus cannot be performed in any useful embodiment by mental steps in the human mind.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for constructing a classifier using a training database with a uniform distribution of data entries. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

The invention claimed is:
1. A method comprising:
accessing, by at least one processor, an external data entry comprising a set of external values, each external value associated with a corresponding attribute from a set of attributes relating to fraudulent behavior in a web application;
accessing, by the at least one processor, a classifier trained using entries of a training database, wherein each entry is associated with a classification label from a set of two or more classification labels,
wherein each entry comprises a set of transformed values, each transformed value being associated with a corresponding transformed attribute from a set of transformed attributes;
wherein each of the transformed values of a given entry was generated from a transformation and interpolation applied to values associated with an attribute from the set of attributes of that given entry to decluster the values, wherein a majority of the values are clustered by being concentrated within a sub-range of a range of the values, the sub-range range being smaller than the range and constituting a percentage of the range, and wherein the transformed values are declustered by being distributed across a new range, a majority of the transformed values not being within a sub-range of the new range that constitutes the percentage of the new range, the transformed values including a same number of values as a number of the values prior to transformation;

applying, by the at least one processor, the transformation to an external value associated with the attribute in the external data entry to generate a transformed external data entry;
applying, by the at least one processor, the classifier to the transformed external data entry to generate a classification label estimate configured to indicate whether a user is engaging in fraudulent behavior; and
storing, by the at least one processor, the classification label estimate in association with the external data entry in a data store, the stored classification label estimate used to determine whether the user's use of a web site is fraudulent.

2. The method of claim 1, wherein the transformation is invertible.

3. The method of claim 1, wherein units of the transformed values associated with the transformed attribute are different from units of the values associated with the attribute.

4. The method of claim 1, wherein at least one of the entries in the training database includes an interpolated value associated with a transformed attribute, wherein the interpolated value is determined based on an interpolation function associated with the interpolation applied to a subset of transformed values associated with the transformed attribute.

5. The method of claim 4, wherein an interpolation function of the interpolation is a median, mode, or weighted average of the subset of transformed values.

6. The method of claim 4, wherein a distance metric between the entry comprising the interpolated value and each entry associated with the subset of transformed values is below a predetermined threshold.

7. The method of claim 1, wherein the set of external values are numerical or categorical.

8. A non-transitory computer readable storage medium comprising instructions configured to be executed by a processor, the instructions, when executed by the processor, causing the processor to perform operations comprising:
accessing an external data entry comprising a set of external values, each external value associated with a corresponding attribute from a set of attributes relating to fraudulent behavior in a web application;
accessing a classifier trained using entries of a training database, wherein each entry is associated with a classification label from a set of two or more classification labels;
wherein each entry comprises a set of transformed values, each transformed value being associated with a corresponding transformed attribute from a set of transformed attributes;
wherein each of the transformed values of a given entry was generated from a transformation and interpolation applied to values associated with an attribute from the set of attributes of that given entry to decluster the values, wherein a majority of the values are clustered by being concentrated within a sub-range of a range of the values, the sub-range range being smaller than the range and constituting a percentage of the range, and wherein the transformed values are declustered by being distributed across a new range, a majority of the transformed values not being within a sub-range of the new range that constitutes the percentage of the new range, the transformed values including a same number of values as a number of the values prior to transformation;
applying the transformation to an external value associated with the attribute in the external data entry to generate a transformed external data entry;
applying the classifier to the transformed external data entry to generate to a classification label estimate configured to indicate whether a user is engaging in fraudulent behavior; and
storing the classification label estimate in association with the external data entry in a data store, the stored classification label estimate used to determine whether the user's use of a website is fraudulent.

9. The non-transitory computer readable storage medium of claim 8, wherein the transformation is invertible.

10. The non-transitory computer readable storage medium of claim 8, wherein units of the transformed values associated with the transformed attribute are different from units of the values associated with the attribute.

11. The non-transitory computer readable storage medium of claim 8, wherein at least one of the entries in the training database includes an interpolated value associated with a transformed attribute, wherein the interpolated value is determined based on an interpolation function associated with the interpolation applied to a subset of transformed values associated with the transformed attribute.

12. The non-transitory computer readable storage medium of claim 11, wherein an interpolation function of the interpolation is a median, mode, or weighted average of the subset of transformed values.

13. The non-transitory computer readable storage medium of claim 11, wherein a distance metric between the entry comprising the interpolated value and each entry associated with the subset of transformed values is below a predetermined threshold.

14. The non-transitory computer readable storage medium of claim 8, wherein the set of external values are numerical or categorical.

15. A system comprising:
a processor configured to execute instructions;
a computer-readable medium containing instructions for execution on the processor, the instructions, when executed, causing the processor to perform operations comprising:
accessing an external data entry comprising a set of external values, each external value associated with a corresponding attribute from a set of attributes relating to fraudulent behavior in a web application;
accessing a classifier trained using entries of a training database, wherein each entry is associated with a classification label from a set of two or more classification labels;
wherein each entry comprises a set of transformed values, each transformed value being associated with a corresponding transformed attribute from a set of transformed attributes;
wherein each of the transformed values of a given entry was generated from a transformation and interpolation applied to values associated with an attribute from the set of attributes of that given entry to decluster the values, wherein a majority of the values are clustered by being concentrated within a sub-range of a range of the values, the sub-range range being smaller than the range and constituting a percentage of the range, and wherein the transformed values are declustered by being distributed across a new range, a majority of the transformed values not being within a sub-range of the new range that constitutes the percentage of the new range, the transformed values including a same number of values as a number of the values prior to transformation;

applying the transformation to an external value associated with the attribute in the external data entry to generate a transformed external data entry;

applying the classifier to the transformed external data entry to generate a classification label estimate configured to indicate whether a user is engaging in fraudulent behavior; and storing the classification label estimate in association with the external data entry in a data store, the stored classification label estimate used to determine whether the user's use of a website is fraudulent.

16. The system of claim 15, wherein the transformation is invertible.

17. The system of claim 15, wherein units of the transformed values associated with the transformed attribute are different from units of the values associated with the attribute.

18. The system of claim 15, wherein at least one of the entries in the training database includes an interpolated value associated with a transformed attribute, wherein the interpolated value is determined based on an interpolation function associated with the interpolation applied to a subset of transformed values associated with the transformed attribute.

19. The system of claim 18, wherein an interpolation function of the interpolation is a median, mode, or weighted average of the subset of transformed values.

20. The system of claim 18, wherein a distance metric between the entry comprising the interpolated value and each entry associated with the subset of transformed values is below a predetermined threshold.

* * * * *